May 30, 1967 R. E. UEHLIN ET AL 3,323,120

OPTICAL VERNIER FOR ANALOG-TO-DIGITAL CONVERTERS

Filed Oct. 11, 1963 3 Sheets-Sheet 1

INVENTORS:
Robert E. Uehlin
Charles S. Bridge
Joseph B. Hughes

By [signature]
Attorney

INVENTORS
Robert E. Uehlin
Charles S. Bridge
Joseph B. Hughes
By [signature]
Attorney INVENTORS:
Robert E. Uehlin
Charles S. Bridge
Joseph B. Hughes
By [signature]
Attorney

United States Patent Office 3,323,120
Patented May 30, 1967

3,323,120

OPTICAL VERNIER FOR ANALOG-TO-DIGITAL CONVERTERS

Robert E. Uehlin and Charles S. Bridge, Los Angeles (Northbridge), and Joseph B. Hughes, Los Angeles (Canoga Park), Calif., assignors to Litton Systems, Inc., Woodland Hills, Calif.

Filed Oct. 11, 1963, Ser. No. 315,598
15 Claims. (Cl. 340—347)

The present invention relates to a mechanism for increasing the accuracy of analog-to-digital converters and, more particularly, to an optical vernier mechanism for interpolating incremental distances between discrete positions on a code pattern and producing signals representing distances traveled between the positions.

In the electromechanical converter art, many instruments have been proposed for converting displacements, such as the angular rotation of a shaft, into representative signals. It has been found that, in general, the tolerances of components used in these instruments are such that it is quite difficult to interpret a single level signal representing such a displacement with any accuracy. However, since a multi-level digital representation of the same displacement may be accurately interpreted (since components can generally register two or more levels of distinguishable signals without distortion), instruments have been devised wherein the displacement is converted directly to digital signal form. The arrangements which perform such analog-to-digital conversions are called encoders.

Recently, with an eye on ultra-miniaturized electromechanical systems, there have been great efforts directed to devising methods of increasing the angular resolution and accuracy of encoders while, simultaneously, reducing their overall size and weight. Historically, many encoders have been developed employing a single code disc for converting angular displacement to a binary digital representation with the requisite accuracy. More particularly, in such encoders, a code disc is generally mounted to a rotatable primary shaft, the angular position of which is to be measured. An exemplary binary code disc has a series of concentric rings, each ring being divided into a number of equal sized units of alternate binary significance. Beginning with the inner ring, the units of which represent the most significant digit of the binary number to be generated, the units of the rings at greater radial distances from the center of the disc are one-half the size of the units of the adjacent interior rings. Thus, the units of each ring at increasingly greater radial distances from the disc center represent a decreasingly less significant digit. The binary number representing the shaft position is then read from the code disc by a number of sensors, one sensor being individual to each ring. Angular positions of the shaft are thus converted by the encoder to distinct binary numbers, one for each definable angular position on the disc. Obviously, the ultimate accuracy of the disc encoder is determined by the accuracy with which the smallest unit of the outside ring may be read. To achieve resolutions of a few seconds-of-arc or better with an encoder employing a single code disc on which the finest resolution elements which may be read by conventional methods are positioned, the code disc would have to be several feet in diameter. To eliminate such prohibitive size, attempts to achieve better resolution have been centered around the use of multi-stage encoder devices and of least-significant-bit-reading vernier mechanisms.

The simplest multi-stage devices, two-stage encoders, in general, have a second code disc which is gear driven at a faster rate than the first so that units of its outer ring represent a smaller angular increment of the primary shaft and thus afford a more accurate binary representation. While the resolution of two-stage encoders employing such gear trains is, theoretically, increased, concomitant increases in size and weight of the devices, together with serious gear induced inaccuracies, limit the actual resolution attainable.

More particularly, tooth spacing errors on the gears are normally on the order of one to three minutes-of-arc per gear, independent of gear diameter. Moreover, gear backlash and a relatively large inertia reflected to the input shaft (which have necessitated the addition of corrective and/or compensating circuitry to the encoder system) are problems which generally preclude the use of gear-coupled devices. Attention has, therefore, been directed to mechanizing the second method of increasing encoder accuracy, that of employing a least-significant-bit-reading vernier mechanism with a single disc encoder.

In one type of least-significant-bit-reading vernier mechanism, recently proposed, two photoelectric sensors are positioned adjacent a vernier track corresponding to the least significant digit track of a code disc. In response to light through the passing marks of the vernier track, the sensors generate sinusoidally shaped signals. The relative positions of the sensors are adjusted so that their respective signals are 90° phase-displaced from one another; that is, when one signal has a 0° phase, the other signal has a 90° phase. These signals are applied to phasor-synthesizing apparatus that combines them in varying proportions to produce, for example, ten phase-displaced signals occurring at equal, incremental phase displacements from 0° to 90°. Each of these incrementally phase-displaced signals is applied to a trigger circuit which provides a square wave output signal corresponding to the beginning of the respective incrementally phase-displaced sine-wave. The vernier output signal, which theoretically will describe the position of one of the sensors between two adjacent marks or bit positions, is produced by counting the outputs of the trigger circuits. When the count reaches ten, a reset signal is applied to the counter to initiate a new count.

While high accuracy and resolution are theoretically possible using such a vernier device in which the sensors are positioned so that they derive their signals by sensing adjacent marks on the vernier track of the code disc, the physical impossibility of positioning the sensors close enough together, so that they will sense adjacent marks, has compelled the placement of the sensors at some greater circumferential distance from each other for establishing the 0° and 90° phase relationship. Accordingly, this so-called optical vernier is extremely susceptible to inaccuracies in the positioning of the marks on the disc; for, at one rotational position of the disc the marks may be such as to give a 0° and 90° phase relationship between the sensor signals, but at other rotational positions this condition may not exist. Such mark positioning errors result in erroneous incrementally phase-displaced signals; and these errors are magnified again by the counting apparatus. The counter continues to respond, after one error is introduced, out of step with the disc position for all subsequent indications of position. Furthermore, serious problems arise in applications where the rotational motion of the disc is not continuous, nor in the same direction at all times; and elaborate arrangements are necessary to insure correct conversion where disc motion varies from the forward to the reverse direction with time. The size of the phase-synthesizing vernier, moreover, is a prohibitive feature. More particularly, to theoretically attain accuracies of a few seconds of arc with this vernier, a disc, 14 inches in diameter having approximately 129,600 marks spaced around the periphery thereof at 10 seconds-of-arc increments, has been proposed for use in the encoder. Such a disc is not amenable to use in ultra-miniaturized encoders. Lamp aging, variations in the voltages applied to the lamp, mark width variations on the disc, and imperfect disc centering are still other recognized problems to be coped with when employing such a vernier device.

In contrast to the prior art, the present invention provides an easily mechanized, optical vernier mechanism for employment in two-stage encoders (and the like) for increasing the accuracy and resolution of such encoders by interpolating between adjacent least significant bit positions on the code pattern and producing a highly accurate vernier signal in accordance with this interpolation. In one embodiment of the encoder, for example, mechanized in accordance with the basic principles of the present invention, a code disc of the type described above is attached to the shaft whose movement is to be measured. Above the outer edge of the code disc, an optical wedge is rotatably mounted to a secondary shaft, the optical wedge being arranged to follow the movement of transparent marks on the periphery of the disc from a first to a second position. The transparent marks correspond to the bit positions on the least significant digit track. In following these marks, the optical wedge rotates to refract light passing through the marks to fall on one of the two photosensors. The illumination on the pair of photosensors causes them to produce signals of greater and lesser magnitude, respectively, dependent upon the illumination to which each is exposed. An error signal is generated in accordance with the difference in magnitude between the signals, and the error signal is applied to a motor connected to the secondary shaft for rotating the optical wedge so that the light passing therethrough equally illuminates both photosensors. The rotation of the secondary shaft is then sensed and a vernier signal is generated representing the rotation. It has been determined that the rotational movement of the optical wedge, as measured by the secondary shaft position indicator, is in cosecant proportion to the movement of the marks from the first position to the second position. Utilizing this principle, a 180° rotation of the optical wedge corresponds to the distance between the adjacent least significant bit positions on the code disc. Accordingly, by combining the generated vernier signal, corresponding to the detected angular rotation of the optical wedge, with the coarse reading signals derived from the code disc, a binary number is produced which accurately defines the amount of primary shaft rotation.

Although the invention will be described with particular reference to analog-to-digital converters for measuring shaft angle rotation, the optical interpolator described herein is equally applicable to converters for measuring linear displacement and the like. In general, the invention is applicable to any converter system for measuring linear or angular motion as long as a distance between least significant digits is to be interpolated. A number of devices, contacting and noncontacting alike, may be used to derive the progressively more significant digits of the binary position signal, the optical wedge vernier being utilized to interpolate the distance between marks on a code pattern corresponding to the least significant digits of a binary number.

It is, therefore, an object of the present invention to provide a miniaturizable shaft angle encoder for accurately measuring the rotation of a primary shaft within a few seconds of arc.

It is another object of the present invention to provide a photoelectric vernier device employing an optical wedge for increasing the accuracy of absolute reading position encoders.

It is still another object of the present invention to provide a two speed, coded disc, analog-to-digital converter employing an optical wedge vernier device, wherein a 180° rotation of the optical wedge is equal to the angular resolution of the primary code disc.

Still another object of the present invention is to provide an optical vernier device capable of interpolating the incremental distance traversed between two adjacent least significant bit positions on a code pattern and of producing a signal accurately proportional to the traversed distance.

A further object of the present invention is to provide a two speed, shaft angle encoder employing an optical wedge vernier device for interpolating the curvilinear distance between two least significant bit positions on a coded disc to an accuracy of better than 1 part in 262,144 in spite of lamp aging, variation in lamp voltage, and imperfections in the positioning or resolution of the disc pattern.

The novel features which are believed to be characteristic of the present invention, both as to its organization and method of operation, together with further objects and advantages thereof, will be better understood from the following description considered in connection with the accompanying drawings in which one embodiment of the present invention is illustrated by way of example. It is to be expressly understood, however, that the drawings are for the purposes of illustration and description only and are not intended as a definition of the limits of the invention.

Figure 1:
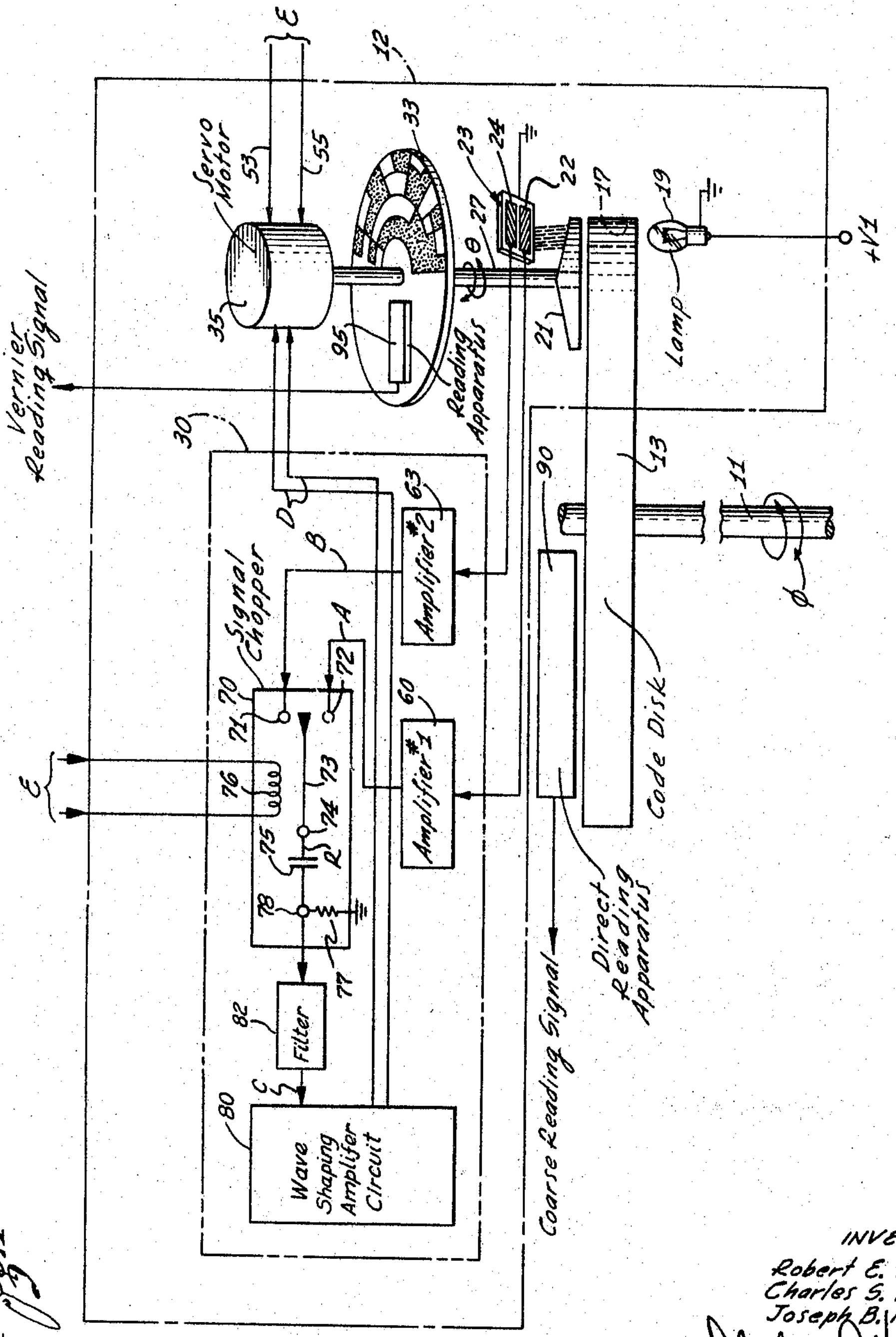
FIGURE 1 is a partly block, partly circuit diagram of a preferred embodiment of a disc encoder mechanized in accordance with the present invention.
Figures 2, 3A, 3B, 3C:
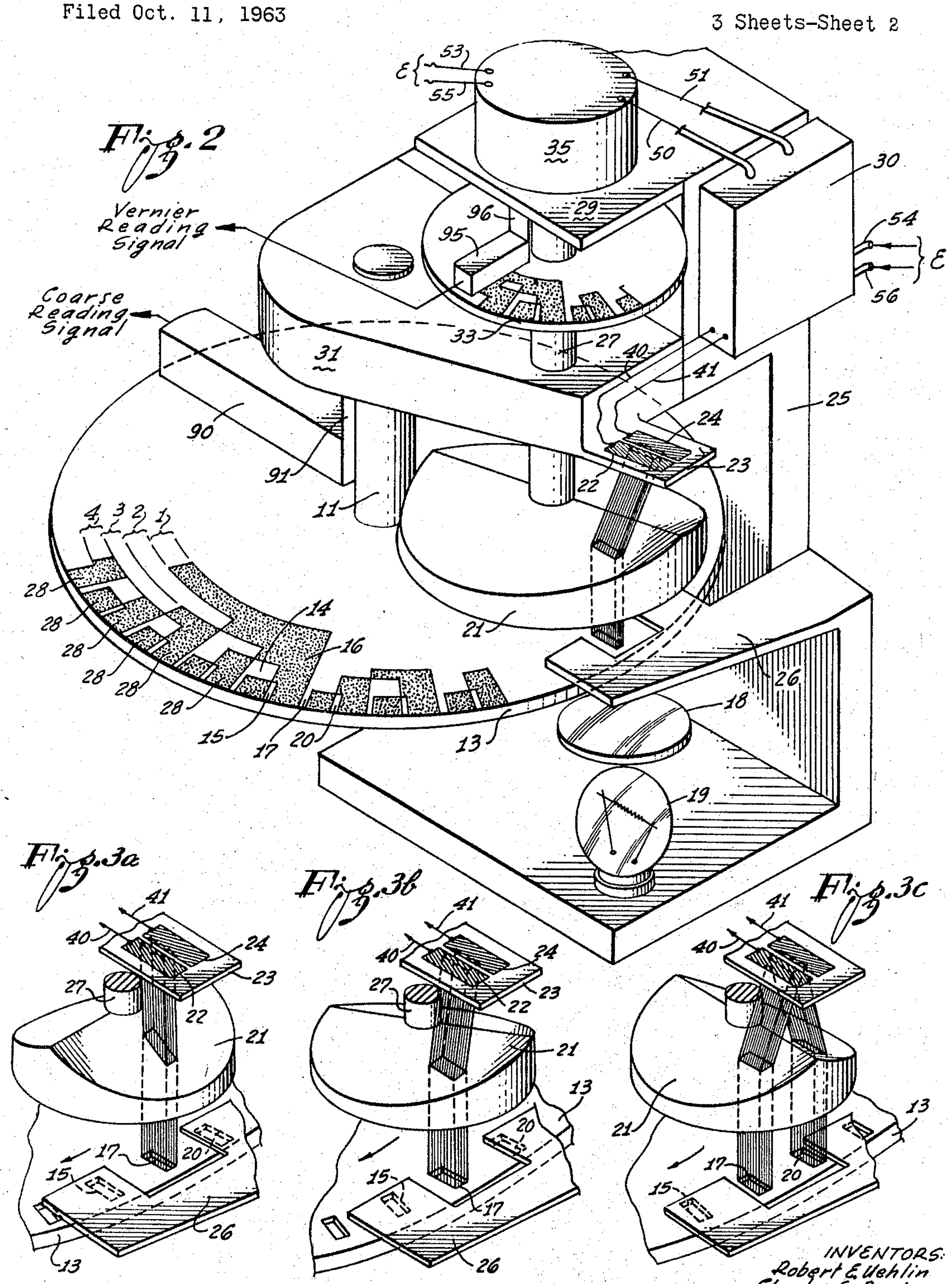
FIGURE 2 is an isometric view of one of the preferred embodiments of the disc encoder illustrated in FIGURE 1.
Figure 4:
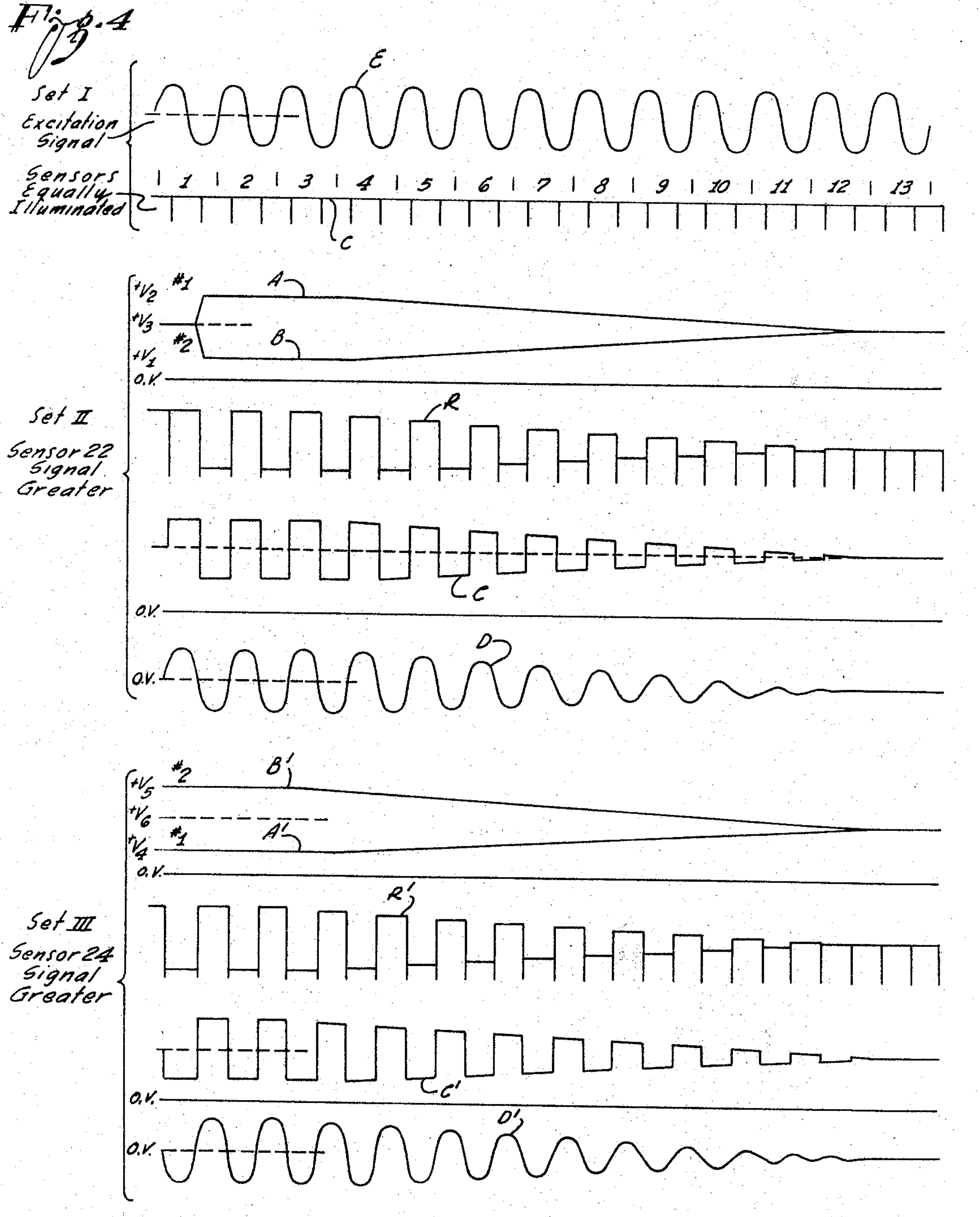

FIGURES 3*a*, 3*b*, and 3*c* are greatly enlarged isometric views of the optical follower portion of a vernier mechanism according to the principles of the present invention, each figure illustrating the optical wedge in one angular position for achieving a photosensor null output; and FIGURE 4 illustrates waveforms of signals produced by the embodiment of the vernier mechanism shown in FIGURE 1.

In reference to the drawings, like or corresponding parts are designated by the same reference characters throughout the several views. Furthermore, the waveforms of signals illustrated in FIGURE 4 will be noted in connection with the descriptions of FIGURES 1 and 2. In FIGURE 1 is shown a partly block, partly circuit diagram of an absolute-reading, two stage disc encoder that is mechanized in accordance with the basic principles of the present invention and which is operative to accurately measure an angular position $\phi$ of a rotatable primary shaft 11 and generate a binary signal representing that position. A direct reading apparatus 90 of the disc encoder senses a pattern of binary values recorded on a code disc 13 and transforms the sensed pattern of binary values into a coarse reading signal that may be combined with a vernier reading signal, produced by an optical vernier mechanism 12, for a composite encoder output signal. Rotational angles $\phi$ of the shaft 11 are defined by distinct binary values recorded on the disc 13, one value for each of the definable rotational angles. As shown in FIGURE 1, the code disc 13 is coupled to the primary shaft 11 for rotation therewith. The reading apparatus 90 is mounted next to the code disc 13 in such a manner that binary values recorded thereon pass adjacent to the reading apparatus as the code disc 13 rotates. Reading apparatus 90 is responsive to the passing binary values for ultimately reading the value positioned beneath the reading apparatus when the code disc stops rotating and for producing a representative coarse reading signal. The optical vernier mechanism 12, mounted so that a series of narrow, transparent slots in the code disc 13 passes beneath it, is responsive to an applied excitation signal E and the angular displacement of the code disc 13 for generating a vernier signal. The vernier signal represents the least significant digits of the binary value at rest beneath the reading apparatus 90.

As specifically shown in FIGURE 1, the optical vernier 12 includes a light source 19 (for example, a lamp) that is mounted so that light rays emitted thereby pass through the narrow, transparent slots in the outer periphery of the disc 13, a transparent slot 17 being illustrated by way of example. The vernier 12 further includes an optical wedge 21 that is rotatably mounted on a secondary shaft 27 adjacent the disc 13 in such a manner that light rays passing through the transparent slots in the disc also pass through wedge 21. The light rays are deflected by the wedge 21, relative to the rotational position of the wedge, to illuminate one sensor of a dual photocell 23 more than a second sensor. In response to such unbalanced illumination by the deflected light rays, photocell 23 produces a pair of signals, each of whose magnitude varies in proportion to the illumination of its respective sensor. The two photocell signals are applied to a difference detector 30 that operates, in response to the excitation signal E, to produce a difference signal D. In turn, the difference signal D is used to actuate a two-phase servo motor 35 for rotating the shaft 27. A second position encoder (such as, for example, a secondary code disc 33 and a reading apparatus 95) is responsive to the rotation of secondary shaft 27 through angles $\theta$ for producing a vernier signal corresponding to the angular position of the shaft 27.

More particularly, as illustrated in FIGURE 1, difference detector 30 includes a pair of balanced amplifiers 60 and 63 that receive, respectively, one of the pair of photocell signals, amplify, and apply them to a signal chopper 70. The excitation signal E is applied to a coil 76 of the signal chopper 70 for driving an interrupter arm 73 back-and-forth between two terminals 71 and 72 in synchronism with the motor 35. Such action of the interrupter arm produces, from the applied photocell signals, a phase-displaced chopper signal R at a terminal 74. However, negative-going spike pulses, introduced by the action of the interrupter arm 73 reciprocating between the terminals 71 and 72, are native to the chopper signal R. Therefore, a filter circuit 82 is included in the difference detector 30 which is responsive to the reproduction of the chopper signal R at an output terminal 78 of signal chopper 70 for filtering signal R to leave a diminishing phase-displaced chopper signal C. The output terminal 78 is coupled to the terminal 74 and to ground through a capacitor 75 and a resistor 77, respectively. An amplifier circuit 80 is included in the difference detector 30 and is responsive to the applied phase-displaced chopper signal C, for amplifying and reshaping the waveform of the chopper signal so that it may be applied to the motor 35 as phase-displaced difference signal D. It should be noted that the motor 35 is responsive to both the difference signal D and the excitation signal E for rotating optical wedge 21 (by rotating shaft 27) until the light rays deflected by the wedge equally illuminate both sensitive areas of photocell 23, thereby reducing the difference signal to zero. The significance of this will become more apparent as the description proceeds.

In FIGURE 2 is illustrated an isometric view of a preferred embodiment of two-stage disc encoder mechanized according to the principles of the present invention. As shown in FIGURE 2, the disc encoder is constructed on a frame member 25. A viewing mask 26, having an open area therein through which the optical wedge 21 views the outer periphery of the code disc 13, is mounted to the frame member 25. The code disc 13 is illustrated as having a code pattern affixed thereto comprising concentric rings or tracks of alternately-spaced coded areas. By reading each ring or track of the coded pattern with appropriate reading apparatus (such as, for example, commutator brushes if the coded areas comprise alternate conducting and non-conducting segments) a signal representing one digit of a binary number is produced. The binary number defines a particular angular position of the primary shaft. Beginning with an innermost track 1 from which a signal representing the most significant digit of the binary number is derived, a signal is derived which represents a decreasingly less significant digit from each ring or track at increasing radial distances from the shaft 11. Thus, as illustrated in FIGURE 2, three decreasingly less significant digits of the binary number are derived from a track 2, a track 3, and a track 4, respectively, the least significant digits of the binary number being read from track 4.

In this regard, to determine the angular position of the shaft 11 with greater accuracy and resolution, without the addition of more digit tracks to the disc, the present optical vernier invention operates to interpolate the distance between the least significant bit positions on track 4 by noting the location of the bit positions relative to their position in the open area of the mask 26. More particularly, assume that track 4 is provided with alternate conducting and non-conducting segments around the disc. At a greater radial distance from the shaft 11 than track 4, but adjacent thereto, is located an opaque ring 28 having a plurality of narrow, elongated, transparent slots (or indicia) located therein, each slot being radially oriented and positioned in line with the junction of a conducting and its adjacent non-conducting segment of track 4. For example, there is shown in FIGURE 2, that a transparent slot 15 is positioned at the junction of a non-conducting segment 14 and a conducting segment 16. Similarly, a pair of transparent slots 17 and 20 are positioned adjacent to the junctions of their corresponding conducting and non-conducting segments of track 4.

As is apparent from FIGURE 2, the transparent slots pass beneath the mask 26 as the disc 13 rotates with shaft 11. The open area of the mask 26 is constructed such that its width is equal to the width of two adjacent slots plus the space interval therebetween. As encoder disc 13 rotates, one slot at a time appears from beneath the mask and traverses the width of the open area therein. At the moment when a first slot leaves the field of view of the open area of the mask, a second slot appears from the opposite side thereof. The second slot, then, similarly traverses the field of view until the next takes its place. The optical vernier of the present invention is adapted to follow this traversing motion of the slot and produce a signal accurately defining the position of the slot within the field of view of the mask.

Continuing with the description of the disc encoder mechanized according to the principles of the present invention, it is shown in FIGURE 2 that a lens 18 is positioned between the lamp 19, mounted on frame 25, and the disc 13 for causing the light rays emitted by the lamp to be substantially parallel as they pass through the transparent slots of the disc 13 and the open area of viewing mask 26. As mentioned hereinabove, the light rays also pass through the optical wedge 21 and are refracted by the wedge to illuminate different areas of photocell 23. The photocell 23 comprises a sheet of silicon material in which there has been introduced a given type of impurity and on which there has been diffused two areas of opposite polarity impurity for creating a pair of photosensors 22 and 24, respectively. The photosensors are appropriately biased for providing output signals proportional to their respective illumination. The pair of photocell signals are applied to the difference detector 30 over a pair of electrical conductors 40 and 41, respectively. The difference detector 30, which is mounted to the upper structure of frame member 25, is actuated by the excitation signal E applied to a pair of difference detector terminals 54 and 56. The difference detector 30 operates upon the pair of photocell signals to produce the difference signal D which is applied to one phase winding of the motor 35 over control winding conductors 50 and 51. Excitation signal E is also applied to a pair of terminals 53 and 55 connected to a second phase winding of the motor 35 for operating the motor (which is mounted on an extension 29 of the frame 25) in synchronism with the difference detector 30. The reasons for operating the motor in synchronism with the difference detector will become readily apparent to those skilled in the art when considering the discussion of the disc encoder operation related hereinbelow.

As is further illustrated in FIGURE 2, an extension 31 of frame member 25 is located for providing a solid structure to which the primary shaft 11 and the secondary shaft 27 may be pivotally mounted. Also, the extension 31 provides a mounting location, directly above the primary disc 13, for a bracket arm 91 which supports the reading apparatus 90. Similarly, a bracket arm 96, connected to the extension 29, supports the vernier reading apparatus 95 over the secondary disc 33.

Attention is directed now to FIGURES 3*a*, 3*b*, and 3*c* wherein is shown the optical follower portion of the vernier mechanism according to the present invention, each each figure illustrating the optical wedge 21 at a different rotational position for obtaining equal signals from both sensors of the photocell 23. More particularly, in FIGURE 3*a* it is shown, for example, that the narrow transparent slot 17 of the disc 13 is centered in the open area of the mask 26; while, the preceding and succeeding transparent slots 15 and 20, respectively, are hidden by the mask 26 from the view of the wedge 21. The optical wedge is shown in its corresponding rotational position such that the top edge of the wedge is perpendicular to the radially oriented slots with the minimum thickness of the wedge being located directly above the slot 17. In this position, the light beam passing through the slot 17 is refracted radially with respect to the optical wedge. The photocell, as shown in FIGURES 3*a*, 3*b*, and 3*c*, is appropriately positioned above the optical wedge 21 and has its top protective material removed to better illustrate the equal distribution of the light beam on both photosensors 22 and 24.

Similarly, as shown in FIGURE 3*b*, the slot 17 is visible in the open area of the mask 26, but the disc 13 has been rotated such that the slot 20 is about to come into the field of view. The optical wedge 21 has also been rotated by the shaft 27, in response to the rotation of the disc 13, to focus, again, the light rays passing through the slot 17 equally on both sensors 22 and 24 of photocell 23. It is readily apparent that the refraction of the light beam in this wedge position has two components, one parallel to the wedge radius and the other parallel to a wedge tangent.

If the disc 13 is rotated still further, as shown in FIGURE 3*c*, the transparent slots 17 and 20 both become visible in the field of view of mask 26. Close observation of FIGURE 3*c* reveals that, whereas the slot 20 has just become fully visible in the field of view, continued rotation of the disc 13 in the same direction would obscure the slot 17 under the mask. The two beams of light passing through the slots 17 and 20, as shown in FIGURE 3*c*, are refracted by the wedge 21 (illustrated in a third rotational position) to equally illuminate the sensors 22 and 24 of photocell 23. The direction of refraction here is substantially parallel to the wedge tangent.

It should be pointed out at this time that the angle of slope of the roof-top of the wedge 21 is controlled by two major factors. These determinants are the index of refraction of the glass of which the wedge is manufactured and the distance separating the wedge 21 and the photocell 23. By the application of these determinants with Snell's Law of refraction, one skilled in the art is able to calculate the angle of slope of the top of the wedge. In addition, the wedge 21 is normally positioned a few tenths of an inch above the code disc 13, so as to make the total configuration as compact as possible.

During the discussion of operation of the two-speed disc encoder which hereinafter follows, frequent reference will be made to FIGURE 4 wherein is illustrated, on a common time scale, various waveforms of signals which may occur during the normal operation of the disc encoder illustrated in FIGURES 1 and 2. It will be noted that they have been grouped in three sets, the first set (Set I) illustrating the excitation signal E and a chopper signal C produced by the signal chopper 70 when no difference exists between the applied photocell signals produced by the two sensors; the second set (Set II) illustrating the signals appearing during the normal operation of the encoder when the sensor 22 is more illuminated than the sensor 24; and, the third set (Set III) illustrating waveforms of the signals which would appear during the encoder operation when the sensor 24 is more illuminated than the sensor 22.

Attention is directed again to FIGURE 1, wherein it will be assumed for purposes of example, that the disc 13 has been rotated so as to illuminate the sensor 22 more than the sensor 24. It is shown in FIGURE 1 that light rays passing through the slot 17 fall more on the sensor 22 than on sensor 24 resulting in a greater magnitude signal being produced by sensor 22 than sensor 24. Accordingly, in response to this unbalanced illumination, signal A produced by the sensor 22 and amplified by the amplifier 60 is of greater magnitude ($V_2$) than the magnitude ($V_1$) of the signal produced by the sensor 24 and amplified an equal amount by amplifier 63, these signals being illustrated in Set II of FIGURE 4. The signals A and B from the amplifiers 60 and 63, respectively, are applied to the signal chopper 70 at the terminals 72 and 71, respectively. In response to the application of the excitation signal E, applied across the coil 76 of signal chopper 70, the interrupter arm 73 is reciprocated between terminal 71 and terminal 72 for producing at the terminal 74 the 90° phase-displaced chopper signal R, lagging the excitation signal E by 90°. The filter circuit 82 removes the narrow negative-going spikes from signal R, occurring at the transition times between a first potential and a second potential of the signal, leaving only the diminishing square-wave signal C. The square-wave, phase-displaced, chopper signal C is applied to the wave-shaping and amplifying circuits 80 which transform the square-wave to a sinusoidal waveform D and amplify this waveform so that it may be applied to the servo motor 35. The excitation winding of the motor 35 receives its power from the excitation signal E in parallel with the signal chopper 70. In this manner, the excitation winding is driven in the same phase relation as the chopper. The difference signal D, that is applied to the drive winding of the motor 35, lags the excitation signal E by 90°. Upon receiving the drive signal from the amplifier circuit 80, displaced 90° from the excitation signal, the servo motor 35 turns toward the drive winding. This rotational motion is transferred to the optical wedge through the shaft 27, thereby turning the optical wedge 21 so as to refract the light passing therethrough toward the central null position of the dual photocell 23 so that each sensor is illuminated equally. As the projected light beam moves toward this balance point, signals A and B converge toward level $V_3$, and therefore the amplitude of difference signal D diminishes. This will be noted by referring to the signals, illustrated in Set II of FIGURE 4 wherein, between the 4th and the 12th time intervals, the output signals A and B of the sensors converge toward the same D.C. level $V_3$ and, accordingly, the difference signal D diminishes to zero amplitude. At the point in time where the light beam has reached the central null position, the difference signal D applied to the motor 35 has reduced to zero amplitude. The encoder is then in a state of null error or equilibrium.

If, for example, the code disc 13 had been rotated in the opposite direction, thereby first illuminating the sensor 24 of the photocell 23 more than the sensor 22, then the D.C. output signal of the sensor 24 would be of greater magnitude than that signal produced by the sensor 22. In this regard, as illustrated in signal Set III of FIGURE 4, the signal produced by the sensor 24 is labeled B′ and the signal produced by the sensor 22 labeled A′, signal B′ being greater in magnitude (level $V_5$). Then signal A′ (level $V_4$). Thus, after applying these two sensor signals to the difference detector 30, a phase-displaced difference signal D′, leading the excitation signal E by 90°, is produced by the detector 30 which is applied to the servo motor 35. In response thereto, the motor 35 rotates in the reverse direction, or in other words, according to conventional two-phase induction motor theory, in a direction toward the excitation winding until again the equilibrium point is reached when A′ and B′ have converged toward level $V_6$. It should be apparent that, when the equilibrium point is reached, the chopper signal produced at the terminal 74 has only narrow, negative-going spikes thereon which are filtered out by capacitor 75 leaving a D.C. level signal, insufficient for driving the motor 35.

In a shaft encoder mechanized in accordance with the principles of the present invention, the rotation of the optical wedge 21 is non-linear. In this regard, again referring to FIGURE 2, it has been determined that, because the movement of the light beam through the mask (with respect to the optical wedge) is tangential, the rotation of the optical wedge must move according to a cosecant function in order to successfully follow the light beam across the mask opening. The secondary code disc 33, therefore, is mechanized to follow this non-linear function. More particularly, this secondary code disc is programmed to follow a cosecant function for the first 180° rotation, and then repeat the process for the second 180° side. By using this form of secondary encoder disc, the vernier output signal produced by the reading apparatus 95, in response to the coded pattern of the disc 33, is linear in form and compatible with the output signal of the reading apparatus 90 which senses code disc 13.

It will be recognized by those skilled in the art, that a number of means commonly known in the art are available for combining the coarse reading signal with the vernier reading signal to provide a composite encoder output signal representing, with very high accuracy, the magnitude of rotation of the primary shaft 11. The reading accuracy of the vernier device of the present invention is such that if there were a process developed by which the outer track of the code disc 13 could be formed with greater accuracy, the optical wedge vernier mechanism could read this outer track to a theoretical accuracy of at least 0.01 second-of-arc.

It is, therefore, clear that remarkable improvements in accuracy, simplicity of operation, resolution, and circuit design may be obtained by employing a vernier mechanism of the present invention in the mechanization of high accuracy shaft angle encoders. It is to be understood that the above described arrangements are only illustrative of the application of the present invention. Numerous other arrangements may be devised by those skilled in the art without departing from the spirit and scope of the invention. Thus, by way of example and not of limitation, it is apparent that a resolver type readout may be used on the secondary shaft to provide an analog signal readout. Furthermore, a number of equally suitable difference detecting circuits now known in the art may be employed to receive the output signals of the photosensors 22 and 24 and to produce a phase-displaced difference drive signal that is applied to whatever means are used for rotating the optical wedge could be constructed to have the same diameter as the code disc 13. Such an optical wedge would be mounted coaxially with the code disc; and a plurality of photosensors would be positioned in a manner that would allow a beam of light, passing through a transparent slot, to be sequentially followed by the optical wedge. The requirement of following a beam of light across the roof-top of the optical wedge would, then, be obviated. Accordingly, from the foregoing, it is evident that these and various other changes may be made without departing from the spirit and scope of the invention as defined in the appended claims.

What is claimed as new is:

1. An optical vernier device for interpolating between a pair of predetermined points on a movable object, said vernier device comprising:

means for producing a beam of light in accordance with the position of one of the predetermined points moving with the movable object;

a sensing control means responsive to illumination by said beam of light for producing a signal in proportion to the distance separating the point of illumination of said beam of light on said sensing control means and a balance point on said sensing control means;

a movably mounted light deflection means for focusing said beam on a position of said sensing control means in accordance with the position of said one of the predetermined points;

means operative in response to said signal for moving said light deflection means to deflect said beam to focus on said balance point on said sensing control means; and means for detecting the movement of said light deflection means.

2. An optical vernier device as defined in claim 1 wherein said light deflection means comprises an optical wedge.

3. An optical vernier device for interpolating between indicia on a moving object, said optical vernier comprising:

a light producing means for producing a light beam positioned in accordance with the angular location of one of said indicia;

a sensor means responsive to the application of said light beam for producing a signal proportional to the distance between a point of incidence of said light beam on said sensor means and a predetermined point on said sensor means;

a rotatably mounted light deflection means interposed between said light producing means and said sensor means and responsive to the application of said signal for rotating to deflect said light beam such that said point of incidence coincides with said predetermined point; and a means for detecting the magnitude of rotation of said light deflection means.

4. An optical vernier device as defined in claim 3 wherein said light deflection means includes an optical wedge having two variable refraction surfaces thereon.

5. In an optical vernier device, the combination comprising:

a movable object having indicia thereon;

a selection means positioned adjacent said movable object for selecting a pair of adjacent indicia between which distance is to be interpolated;

a means for producing corresponding beams of light in accordance with the position of said selected indica;

a light sensitive means having an equilibrium point thereon, and being responsive to beams of light for generating signals proportional to the distance between said equilibrium point and points of incidence of light thereon;

a rotatably mounted variable refraction means positioned between said selection means and said light sensitive means for receiving the beams of light and, in response to said signal, rotating so as to focus the light beams for causing said point of incidence to coincide with said equilibrium point; and a detection means coupled to said variable refraction means for detecting the angular rotation of said refraction means and for producing a signal corresponding thereto.

6. The combination as defined in claim 5 wherein said selection means comprises a mask member having an open area therein, the width of said open area being equal to the width of two of said indicia plus the space interval therebetween.

7. The combination defined in claim 6 wherein said variable refraction means comprises an optical wedge coupled to a servo motor, said optical wedge being rotatable through 180° to follow an indicia as it traverses said open area of said mask member.

8. The combination defined in claim 7 wherein said indicia comprise narrow, evenly spaced transparent slots positioned in a substantially opaque track.

9. An analog-to-digital converter employing an optical vernier device for reading a least significant bit position on a code pattern, said converter being operative to generate signals representing the angular position of a rotatable primary shaft connected thereto, said converter comprising:

a frame member;

a rotatable primary code disc coupled to the primary shaft, said code disc having a plurality of inner concentric rings of code patterns positioned thereon and an outer ring being substantially opaque and having a plurality of narrow evenly spaced transparent indicia positioned therein;

a means for sensing said inner rings of code patterns, and for producing a plurality of coarse reading signals corresponding thereto;

a light source mounted to said frame member and positioned adjacent to said outer ring for shining light through said transparent indicia;

a mask element connected to said frame member and positioned adjacent to said primary code disc above said plurality of transparent indicia, said mask having an open area therein for selecting two adjacent indicia between which the distance is to be interpolated a photosensitive device mounted to said frame member above said open area in said mask element so as to receive light passing through said transparent indicia, said device having dual sensitive areas for producing sensor signals proportional to the unbalanced illumination of said dual sensitive areas;

a secondary shaft rotatably coupled to said frame member;

a motor means for rotating said secondary shaft;

a circuit means responsive to the application of said sensor signals for producing a difference signal which is applied to said motor means for actuating said motor means;

an optical wedge coupled to said secondary shaft and positioned above said mask member for receiving light passing through said transparent indicia in said code disc and through said open area in said mask, said optical wedge being rotatable so as to focus said light equally on both sensitive areas of said photosensitive device; and a detector means coupled to said secondary shaft for sensing the magnitude of rotation of said secondary shaft, and for producing a signal proportional thereto.

10. An analog-to-digital converter as defined in claim 9 wherein the width of said open area in said mask element is defined by the width of two adjacent transparent indicia plus the width of the interval therebetween.

11. A miniaturized optical binray protractor for converting the magnitude of a rotational angle of a shaft into a binary number having a plurality of digits, said converter comprising:

a source of light;

a binary calibrated disc positioned in the path of the light from said source and being rotatable by the shaft, said disc having a plurality of spaced annular rings and an outer annular ring, a digit of the binary number being derived from each of said plurality of rings, said outer ring being provided with alternate transparent and opaque areas;

first means for reading said plurality of annular rings, and producing signals representative of the readings, said first means being positioned adjacent the surface of said disc;

a photosensitive device responsive to the light transmitted through said transparent areas in said outer ring for producing a signal in proportion to the distance separating the point of incidence of said light on said device and a predetermined point on said photosensitive device;

a movably mounted light deflection means responsive to said signal for moving to deflect the light in proportion to the position of said deflection means to focus said light on said predetermined point; and a transducer means for producing electrical signals corresponding to the movement of said light deflection means.

12. An optical, rotational analog-to-digital converter for indicating the function of the rotational angle of a shaft in the form of a binary number having a plurality of digits, said converter comprising:

a light producing means;

a rotatable primary disc positioned in the path of the light from said light producing means, said disc being calibrated with a plurality of groups of sections representing the plurality of digits, respectively, of binary numbers, said groups being arranged in annular rings, said disc including an outer ring having transparent and opaque areas positioned thereon, respectively, to the illumination from said light producing means for representing a least significant digit of the binary number;

means for coupling said disc to the shaft for rotation therewith;

means for selecting an adjacent pair of said transparent areas;

a photosensitive element having a balance point thereon, said photosensitive element receiving light transmitted through at least one of said selected pair of least significant transparent areas for producing a signal in proportion to the distance separating the point of incidence of said light and said balance point;

a secondary shaft;

an optical wedge rotatably mounted on said secondary shaft for deflecting the light transmitted through at least one of said selected pair of transparent areas and tending to continuously focus the light passing therethrough on said balance point;

a motor means responsive to the application of said signal for rotating said secondary shaft in response thereto to control the angular position of said optical wedge; and a transducer means for detecting the magnitude of angular rotation of said secondary shaft.

13. The combination defined in claim 12 wherein said selection means comprises a mask member having an open area therein the width of which is equal to the width of two of said adjacent transparent slots plus the width of the interval therebetween.

14. The combination defined in claim 13 wherein said photosensitive element includes a pair of photocells juxtaposed on either side of said balance point and a first distance above said optical wedge for sensing light refracted away from said balance point toward one or the other of said photocells and for producing a pair of unbalanced sensor signals representing such refraction, and circuit means responsive to the application of said pair of unbalanced sensor signals and a phase reference excitation signal for detecting the difference between said sensor signals and generating a difference signal 90° phase-displaced from said phase reference excitation signal as determined by the direction toward which one of said pair of photocells light was refracted.

15. An optical vernier instrument for accurately reading bit positions on a movable code pattern, said vernier instrument comprising:

a first means for selecting an adjacent pair of the positions on the code pattern and producing beams of light corresponding to the position of the pair of bit positions as the code pattern moves;

a photosensitive means positioned adjacent said first means and having a balance point thereon, said photosensitive means being responsive to light beams incident on points away from said balance point for generating a difference signal corresponding to the distances separating said points of incidence and said balance point; and a movably mounted optical wedge interposed between said first means and said photosensitive means and being responsive to the application of said difference signal for moving so as to tend to continuously focus said beams of light on said balance point.

References Cited

UNITED STATES PATENTS 3,152,325 10/1964 Kaestner ---------- 340—347

MAYNARD R. WILBUR, *Primary Examiner.*

DARYL W. COOK, *Examiner.*

K. R. STEVENS, W. J. KOPACZ, *Assistant Examiners.*